July 24, 1928.

T. L. R. COOPER

DYNAMO ELECTRIC MACHINE

Filed July 20, 1925    2 Sheets-Sheet 1

1,678,380

INVENTOR
THOMAS LANCELOT REED COOPER,

By Toulmin & Toulmin,

ATTORNEYS

July 24, 1928.　　　　　　　　　　　　　　　1,678,380
T. L. R. COOPER
DYNAMO ELECTRIC MACHINE
Filed July 20, 1925　　　2 Sheets-Sheet 2
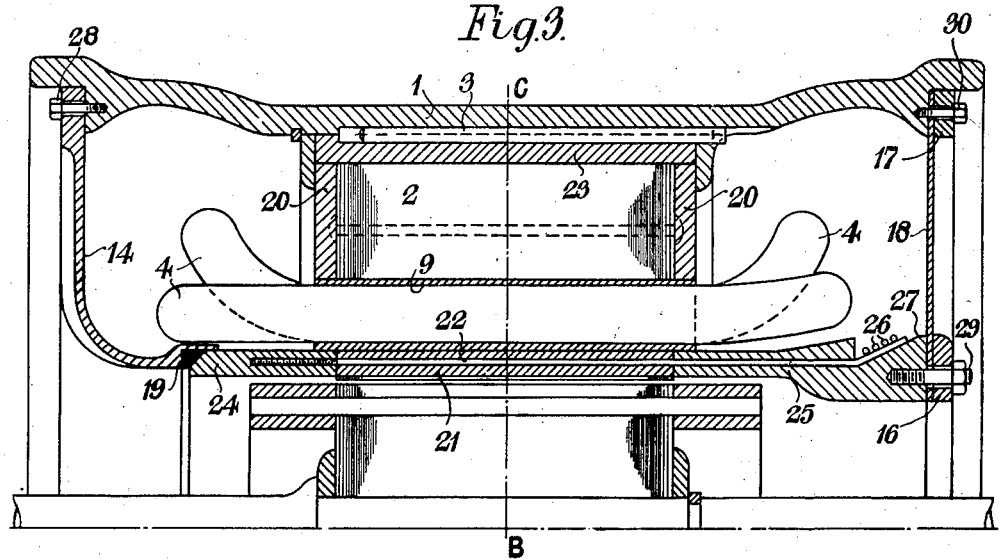
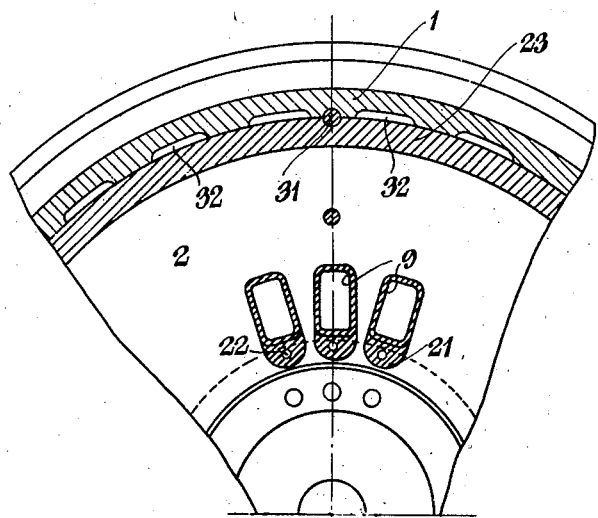
INVENTOR
THOMAS LANCELOT REED COOPER,
ATTORNEYS Patented July 24, 1928.

1,678,380

UNITED STATES PATENT OFFICE.

THOMAS LANCELOT REED-COOPER, OF LONDON, ENGLAND.

DYNAMO-ELECTRIC MACHINE.

Application filed July 20, 1925, Serial No. 44,688, and in Great Britain July 25, 1924.

This invention relates to dynamo-electric machines of the type wherein the stator windings are totally enclosed in a fluid tight chamber which can be filled with an insulating fluid such as transformer oil, the said machine being adapted to be operated submerged in water or in a damp or gassy atmosphere.

The object of the present invention is to provide an improved construction of such machines adapted to more effectually prevent the penetration of liquid between the laminæ of the stator core and thence to or from the stator winding enclosure.

The improved construction according to the present invention comprises a stator enclosure consisting of a hard insulating material and completely enclosing the back or outer side of the stator laminæ, in combination with end coatings and slot linings of the same material.

In order that the nature of the invention may be clearly understood examples in accordance therewith will now be described with reference to the accompanying drawings in which Fig. 1 is a longitudinal sectional view showing one form;

Fig. 3 is a longitudinal sectional view of another form;

Fig. 4 is a section on the line C—D of Fig. 3.

Figure 1:
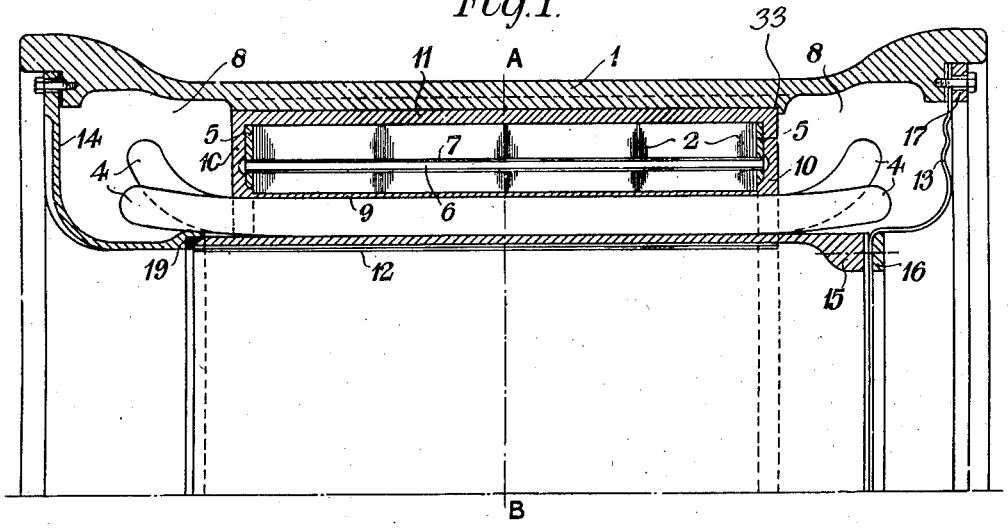
Figure 2:
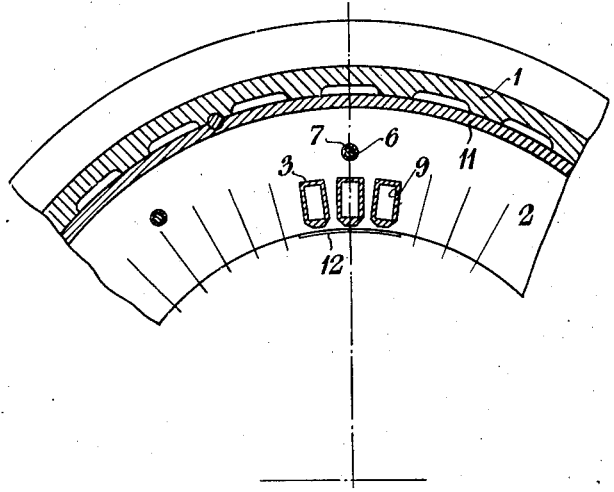
Fig. 2 is a section on the line A—B of Fig. 1.

Referring to Figs. 1 and 2 of the drawings part of the outer frame of a squirrel cage motor is shown at 1 (Fig. 1) and the laminations of the stator ring core are indicated at 2, these laminations being of the usual slotted type with closed slots 3 for the windings 4. The said slots however may be of the semi-closed type, if preferred, without altering the essential feature of the invention.

To construct the stator and the fluid-tight enclosure of the same the required number of the laminations are assembled and compressed together upon a mandrel between thick steel plates 5 and are held by rivets 6, the ends of which engage in the thick end plates 5. The rivets are shown as solid and covered with a layer of insulation 7; but they may be tubular, if desired, so as to allow insulating fluid in the stator chamber 8 to pass through.

In order to enclose the stator laminations 2 on all sides, it is preferable to employ an insulating material which is normally plastic and hardens when heat-treated, such for instance as the material known as "bakelite".

Tubes 9 of the material used having a thickness of about .06″ are inserted in the slots 3 of the stator core with a suitable mandrel within each tube. The ends of the laminated core ring are then thickly coated with the insulating material as shown at 10 which is passed into the spaces between the slots 3 and also into any spaces in the slots so as to join up with the ends of the tubes 9 in the slots, these end plates 10 extending inwards so as to overlap the steel end plates 5.

The outer side of the laminated stator core ring is also thickly coated with the insulating material as shown at 11 and the inner side is thinly coated as shown at 12, both the coverings 11 and 12 being made to join up with the end coverings 10 to form a single covering completely enveloping the stator laminations 2 on all sides and at the same time filling the closed or semi-open lower parts of the slots 3 and joining up with the tubes 9.

Whenever desired the thin covering 12 over the polar faces of the stator laminæ may be entirely omitted. In any case this covering when used is only of the nature of a paint or varnish in no way interfering with the air gap.

The whole covering of the insulating material while still plastic is now subjected to heavy pressure to compress the material and form a solid coating which will enter into any spaces in the laminations, after which the coating is subjected to a suitably high temperature whereby it becomes a hard and strong insulating covering which is non-hygroscopic so that water, oil, or other fluid cannot penetrate the same.

In order to form a suitable joint with the end enclosing covers 13 and 14, the end coating 10 of the insulating enclosure is flanged at each end on the inner diameter to form a rectangular section ring of the material between the mandrels in the slots 3 and the mandrel on which the core is mounted, while at the outer diameter the coating 10 is pressed against a shoulder 33 formed on the interior of the stator frame 1. At the right hand side of Fig. 1, the projecting end ring of insulating material terminates in a thickened portion 15 to which the inner edge of the end diaphragm 13 is secured by means of a clamping ring 16 which is fixed in clamping position by means of screws passing through the ring 16 and the edge of the diaphragm 13 into the thickened portion 15 of the insulating material, the corrugated diaphragm 13 being so formed that on being clamped by the ring 16 to the ring 15 the whole of the stator core is drawn against the shoulder 33. The outer edge of the diaphragm 13 is secured to a machined part of the outer frame 1 by means of a similar clamping ring 17. At the opposite end of the structure the inner edge of the end enclosure 14 is connected up to the adjacent projecting end flange of the end insulating coating 10 by means of a jointing ring 19 of any suitable material, which may be for instance an oil-proof jointing ring of the material known as "Dexine", for which purpose the adjacent surfaces of the parts to be joined are scarfed or spigoted or otherwise suitably formed to make a sound joint, while the outer edge of the diaphragm is bolted to a machined part of the outer frame 1 in such a manner that the end enclosure 14 presses the projecting ring at the end of the insulating coating 10 and thus co-operates with the corrugated diaphragm 13 in holding the stator covering up against the shoulder 33.

When the insulating material has hardened the mandrels are all removed and the said insulating covering is machined or finished, whereupon the entirely enclosed and insulated laminated core is completely ready for winding. The winding of the stator is effected in the manner usual with all machines having closed or nearly closed slots, namely, by threading the conductors through the slots after withdrawing the mandrels therefrom, thus dispensing with the usual slot-troughing or any further preparation. The insulated core can be inserted in the stator frame 1 either before or after winding.

Referring to Figs. 3 and 4, the insulating enclosure for the stator laminæ can be built up with hard tubes and end plates of insulating material, as shown herein, the tubes and end plates being finally joined up or stuck together with a similar material in liquid form so as to form the same kind of enclosure as that already described in connection with Figs. 1 and 2. In this construction insulating tubes 9 are passed into the stator slots as before and end plates 20 of the insulating material used, after being provided with slots registering with the stator slots, are applied over the ends of the tubes 9 so as to join up therewith, while the inner ends of the slots are filled with the plastic insulating material 21 which joins up with the tube 9 and in which is embedded a tie rod 22 in each slot. An outer tube 23 of a similar insulating material is arranged over the outside of the core ring and is joined at its ends with the outer peripheries of the insulating plates 20.

Two tubes or rings 24, 25 of the insulating material are arranged at the ends of the stator and are joined up with the inside periphery of the insulating end plates 20, one end of each tie rod 22 being secured in the ring 24 and the other ends of the tie rods being secured in the ring 25 in any suitable manner; this may be done, for example, by bending up the ends of the tie rods where they issue from the ring 25 and binding these bent up ends with wire 26 upon a thickened or coned outer part 27 of the ring 25.

The inner edge of the end enclosing diaphragm 14 is connected up with the adjacent end of the tube 24 by means of a ring 19 of the material known as "Dexine," for instance, or of other suitable jointing material, as described in connection with Fig. 1, and the outer edge of the diaphragm is fixed to a shouldered part of the frame 1 by means of screws 28. The inner edge of the opposite end diaphragm 18, which in this construction is shown as a plane ring, is secured to the thickened part 27 of the end ring 25 by means of a clamping ring 16 and screws 29, or by studs and nuts, and the outer edge of the diaphragm 18 is secured as before to the frame 1 by means of the clamping ring 17 and screws 30, or by studs and nuts.

In addition to the tie rods 22 rivets such as those shown at 6 in Fig. 1 may also be employed in order to hold the assemblage of stator laminations more firmly together, as shown in dotted lines in Fig. 3.

In order to secure the core in the stator frame 1 after it has been coated with insulating material and to prevent it from rotating within the frame, one or more long circular keys or thin steel rods 31 are inserted axially between the core enclosure and the frame. For this purpose one or more keyways are formed by cutting arcuate slots axially along the coating of the core and similar but somewhat deeper slots axially along the inside of the stator frame, whereupon the steel rods 31 are driven into the circular passage thus formed and thereby secure the core in its position.

In order to allow free circulation of cooling oil or fluid in the stator enclosure, passages 32 are formed axially in the stator frame 1 so as to allow the oil to circulate round the back or outside of the core enclosure.

This construction may sometimes be used to obviate the necessity of having a water jacket round the outside of the frame to cool the core which is in contact with it.

It will be seen from the above description that with the improved construction the stator enclosure is formed independently of the end plates of the machine and thus enables the rotor to be withdrawn when required, without in any way interfering with the joints between the enclosure of the stator laminæ, and the end enclosures.

For large machines requiring special cooling, insulated ducts or passages can be arranged through the core whereby the oil or other insulating fluid, in which the windings are immersed, can circulate through the core to effectively cool same.

From the above description it will be seen that with this improvement a hard insulating material which has no magnetic or inductive effect on the stator core or its winding serves to form a complete enclosure for the stator windings in a chamber which can be filled with insulating oil or other insulating fluid and will prevent water or any other external medium gaining access to the windings or leakage of the oil insulating fluid from the enclosure either from the inner or the outer side of the laminations.

What I claim and desire to secure by Letters Patent is:—

1. The method of constructing a dynamo-electric machine, which comprises first completely enclosing the back and ends and lining the slots of the stator laminæ with a covering of a hard insulating material, then passing the conductors of the stator winding through the lined slots, completing the stator winding, and then securing the stator laminæ and windings thereon within the stator frame.

2. Dynamo-electric machine comprising in combination a rotor and a stator element, and a fluid-tight chamber for the stator windings consisting of a hard insulating material completely enclosing the back and ends of the stator laminæ and lining the stator slots.

3. In a dynamo-electric machine, the combination with a rotor and a stator element, of a fluid-tight chamber for the stator winding consisting of a hard insulating material completely enclosing the back and ends of the stator laminæ and lining the stator slots, and a thin covering of the said insulating material on the polar faces of the stator laminæ.

4. In a dynamo-electric machine, the combination with a rotor and a stator element, of a fluid-tight chamber for the stator windings consisting of a hard insulating material completely enclosing the back and ends of the stator laminæ and lining the stator slots, a projecting end ring on each end of the stator enclosing means and forming a part thereof, and end covers for the ends turns of the stator windings each secured with a fluid-tight joint to the adjacent end ring of the stator enclosure.

5. In a dynamo-electric machine, the combination with a rotor and a stator element, of a fluid-tight chamber for the stator windings consisting of a hard insulating material completely enclosing the back and ends of the stator laminæ and lining the stator slots, a projecting end ring on the insulating covering of the stator, an end cover for the stator windings, means for securing the outer edge of the end cover to the stator frame and an oil-proof joint between the inner edge of said cover and the said projecting end ring on the insulating covering of the stator.

6. In a dynamo-electric machine, the combination with a rotor and a stator element, of a fluid-tight chamber for the stator windings consisting of a hard insulating material completely enclosing the back and ends of the stator laminæ and lining the stator slots, and means for holding the stator core correctly in the stator frame, comprising a key inserted axially on the outside of the stator core between the insulating enclosure and the stator frame.

7. In a dynamo-electric machine, the combination with a rotor and a stator element, of a fluid-tight chamber for the stator windings consisting of a hard insulating material completely enclosing the back and ends of the stator laminæ and lining the stator slots, a shoulder in the stator frame, and an end cover for the end turns of the stator winding secured both to the stator frame and also to the said insulating covering and acting retractively upon the stator to draw the insulating covering of the same firmly against said shoulder in the stator frame.

8. In a dynamo-electric machine, the combination with a rotor and a stator element, of a fluid-tight chamber for the stator windings consisting of a hard insulating material completely enclosing the back and ends of the stator laminæ and lining the stator slots, a shoulder in the stator frame, an end cover secured to the frame at each end of the stator each said end cover being also secured to the corresponding end of the insulating covering, one enclosure acting retractively and the other compressively upon the stator to hold the insulating cover of the same firmly against said shoulder in the frame.

9. In a dynamo-electric machine, the combination with a rotor and a stator element, of a fluid-tight chamber for the stator windings consisting of a hard insulating material completely enclosing the back and ends of the stator laminæ and lining the stator slots, a thickened end ring forming part of the said insulating covering, a clamping ring of approximately the same external and internal diameters as the said thickened end ring, an end cover for the stator windings, and means for clamping the inner edge of the said end cover between the clamping ring and the said thickened end ring of the insulating covering.

In testimony whereof, I affix my signature.

THOMAS LANCELOT REED COOPER.